Feb. 7, 1928.  1,658,715
J. J. M. GUEUX
LIQUID DISPENSING APPARATUS
Filed March 20, 1926   11 Sheets-Sheet 1

Fig.1

Inventor,
Joseph J. M. Gueux.
By William C. Linton.
Attorney.

J. J. M. GUEUX 1,658,715

LIQUID DISPENSING APPARATUS

Filed March 20, 1926     11 Sheets-Sheet 4

Fig. 4

Inventor;
Joseph J. M. Gueux.

By William C. Sinton.
Attorney.

Fig. 11

Inventor;
Joseph J. M. Gueux.
By William C. Linton.
Attorney.

Patented Feb. 7, 1928.

1,658,715

UNITED STATES PATENT OFFICE.

JOSEPH JEAN MARIE GUEUX, OF PARIS, FRANCE.

LIQUID-DISPENSING APPARATUS.

Application filed March 20, 1926, Serial No. 96,325, and in France March 28, 1925.

The present invention relates to an apparatus for the delivery of liquids in measured quantities. The apparatus is chiefly adapted for the delivery of liquid fuel for motor vehicles in quantities which in usual practice consist of units of five liters, or of a multiple of this number.

My apparatus essentially comprises two standard recipients of like capacity, each of which is provided with a supply or inlet conduit, a delivery or outlet conduit, and an overflow conduit. The supply and delivery conduits of these recipients are each provided with a cock and the valve of each cock is controlled by an oscillating lever. Each of the levers is connected with a corresponding crank on a common crankshaft which is controlled from the exterior by a crank carrying a handle.

The overflow conduits of the two recipients meet in a checking or observation chamber having transparent walls, containing a small disc which is connected by jointed rods with a lever having a pointed end coacting with a disc mounted upon the crank shaft and provided with two shoulders co-operating with said pointed end of the lever, whereby the shaft and hence the cocks will operate only when the overflow of one of the two standard recipients is operative.

To the feeding conduit I may add an external checking or observation element made of glass, so that the customer may observe the actual outflow of the liquid.

In a modification, the crankshaft controlling the cocks is replaced by a cam shaft.

The handle of the crank controlling the crankshaft or cam shaft is fitted upon a rod with reference to which it can be subjected to a helical displacement, so that I take advantage of the natural movements of the crank in order to automatically disengage the crank from a sationary abutment at the beginning of the operation, and to arrest it again upon the abutment after making a complete revolution.

In a modification of the dispensing apparatus thus arranged, I dispose the parts in such manner that during the delivery operation, the air pocket in the delivery conduits will be expelled, and that the filled recipient will be emptied at a more rapid rate than that of the filling of the empty recipient.

Finally, I provide two particular dispositions for the control of the element which holds the crankshaft or cam shaft in the fixed position, in the case in which the apparatus is unprovided with an overflow conduit.

Further details of construction are shown in the following description with reference to the appended drawings.

Figs. 10, 11, 12 and 13 show two arrangements for the case in which the dispensing device is unprovided with an overflow conduit.

Figure 1:
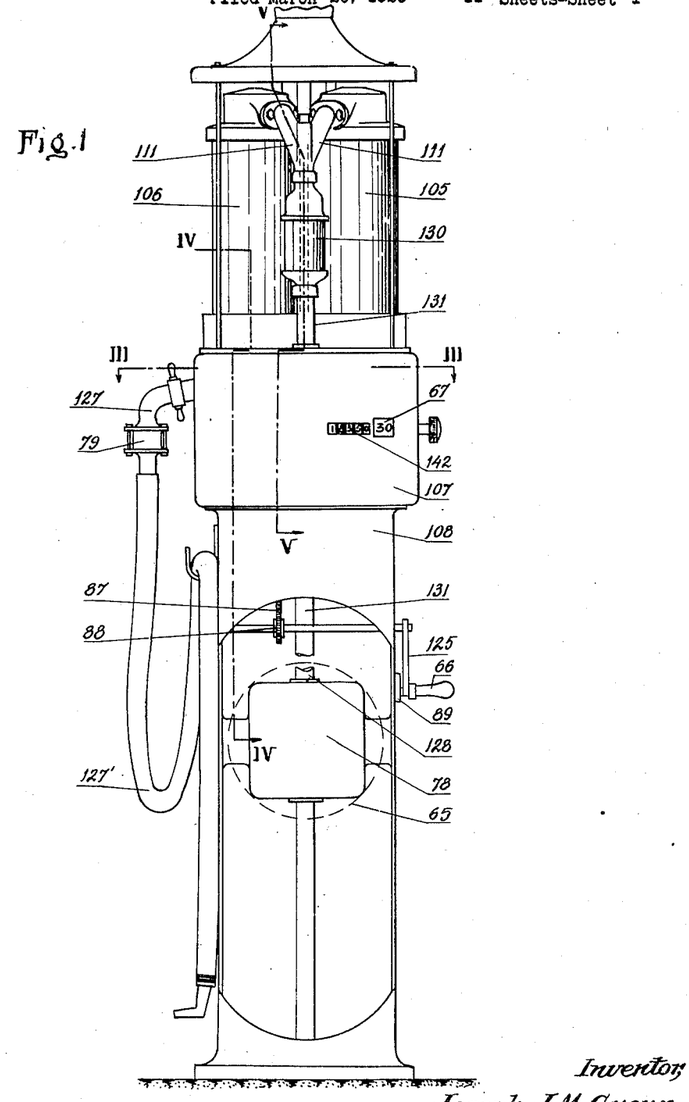
Fig. 1 is an elevational view of the dispensing apparatus.

It is observed in Fig. 1 that the feeding device comprises a raised base 108, carrying a casing 107 containing the mechanism; above the said casing are mounted two standard gauging recipients 105 and 106 which are made of glass and have like capacities, for instance five liters.

This Figure 1 further shows in dotted lines a hand wheel 65 actuating a pump 78 for elevating the liquid fuel, an operating crank 125 for the mechanism, together with its handle 66, and the feeding hose 127.

In Fig. 1 there are shown, through suitable apertures, a totalizing meter 142 and its indicating drum 67 showing the quantities of liquid discharged.

Figure 3:
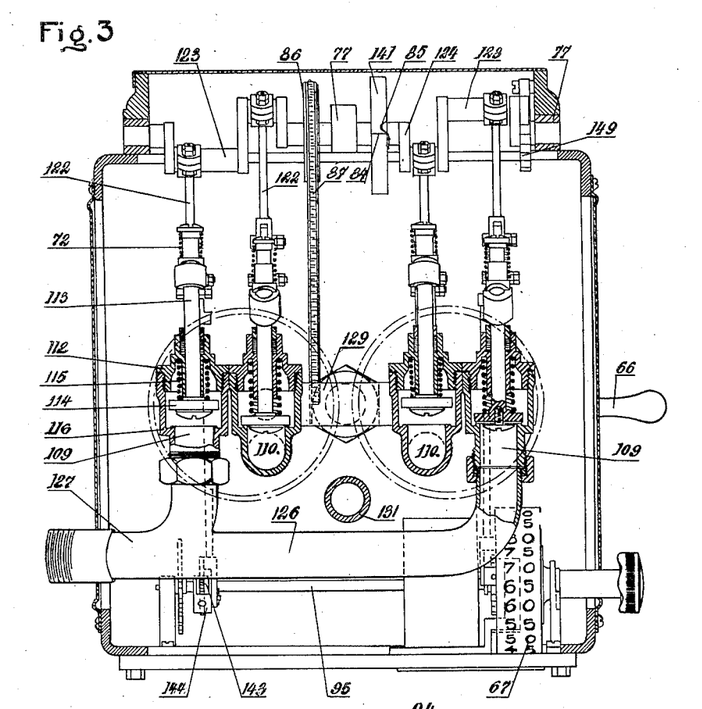
Fig. 3 is a sectional plan view on the line III—III of either Figs. 1 or 2.
Figure 4:
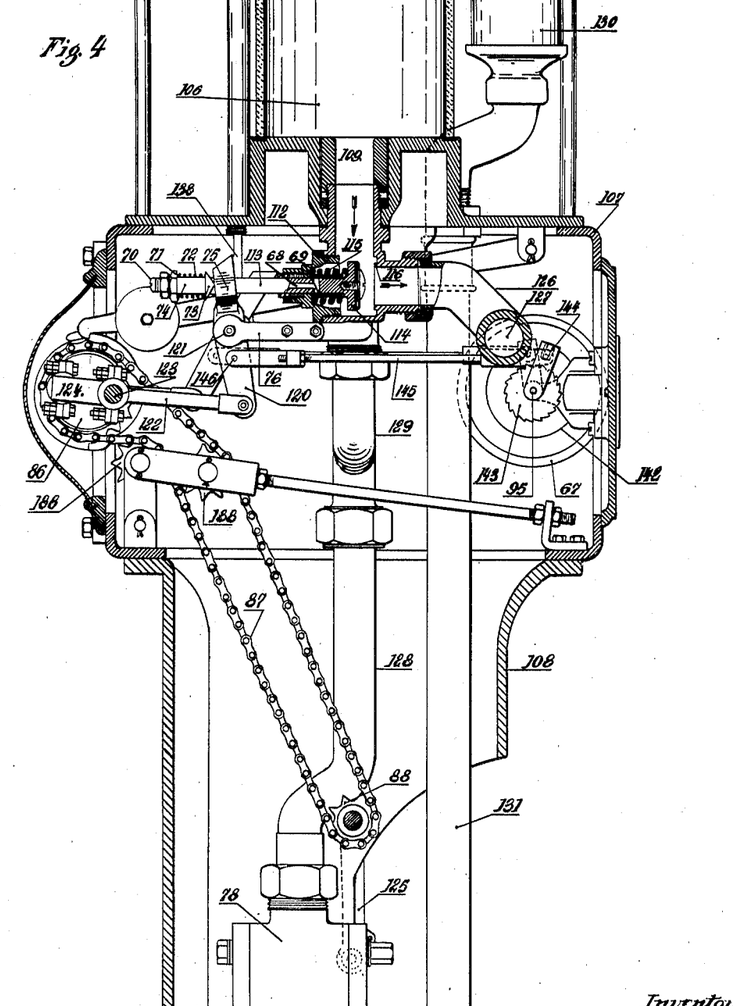
Fig. 4 is a sectional elevation on the line IV—IV of Figure 2.
Figure 5:
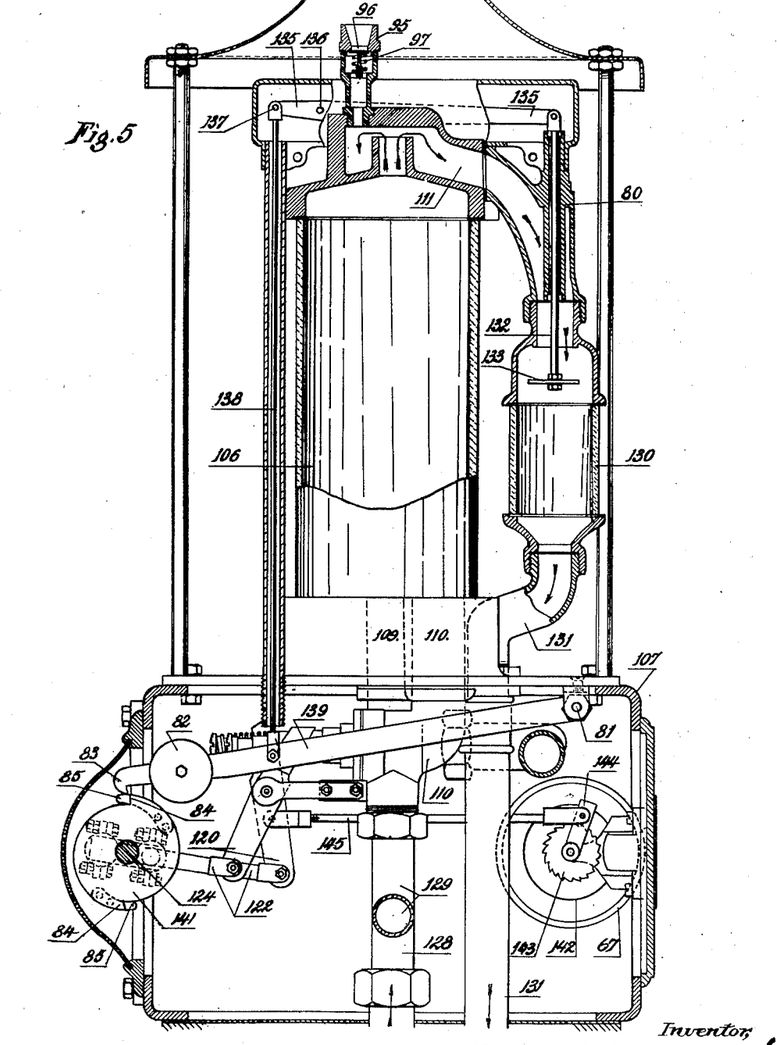
Fig. 5 is a sectional elevation on the line V—V of either Figs. 1 or 2, with parts broken away.

As shown in Figs. 3, 4 and 5, each recipient 105 or 106 is connected with a supply or inlet conduit 110, a delivery or outlet conduit disposed at the lower part, and an overflow conduit 111 starting from the upper part.

Each of the four conduits 109—110 comprises a cock whereby they may be closed at the proper time; said cocks are of like construction, and each comprises all the parts shown in Figs. 3 and 4. Such cocks comprise a plug 112 adapted for the insertion of the stem 113 of a valve 114 which is urged by the spring 115 upon the valve seating 116.

The rod 113 as better illustrated in Figure 4 is pierced with a longitudinal conduit 68 whereof one end communicates with the chamber 69 of the cock plug and the other end is closed by a screw plug 70. The conduit 68 and the chamber 69 are adapted to contain lubricant for the rod 113.

This rod 113 is terminated by a head 71 coacting with a spring 72 which surrounds a small sleeve 74 slidable on the rod 113 and having a shoulder 73 at one end; said shoulder co-operates with the apertured end 75 of a cock handle 120 which is pivoted at 121 to an extension 76 of the cock plug 112.

At its lower end, each handle 120 is connected by a link 122 with one of the sleeves 123 of a horizontal crankshaft 124 mounted in suitable bearings 77 secured to the crankcase 107.

Figure 2:
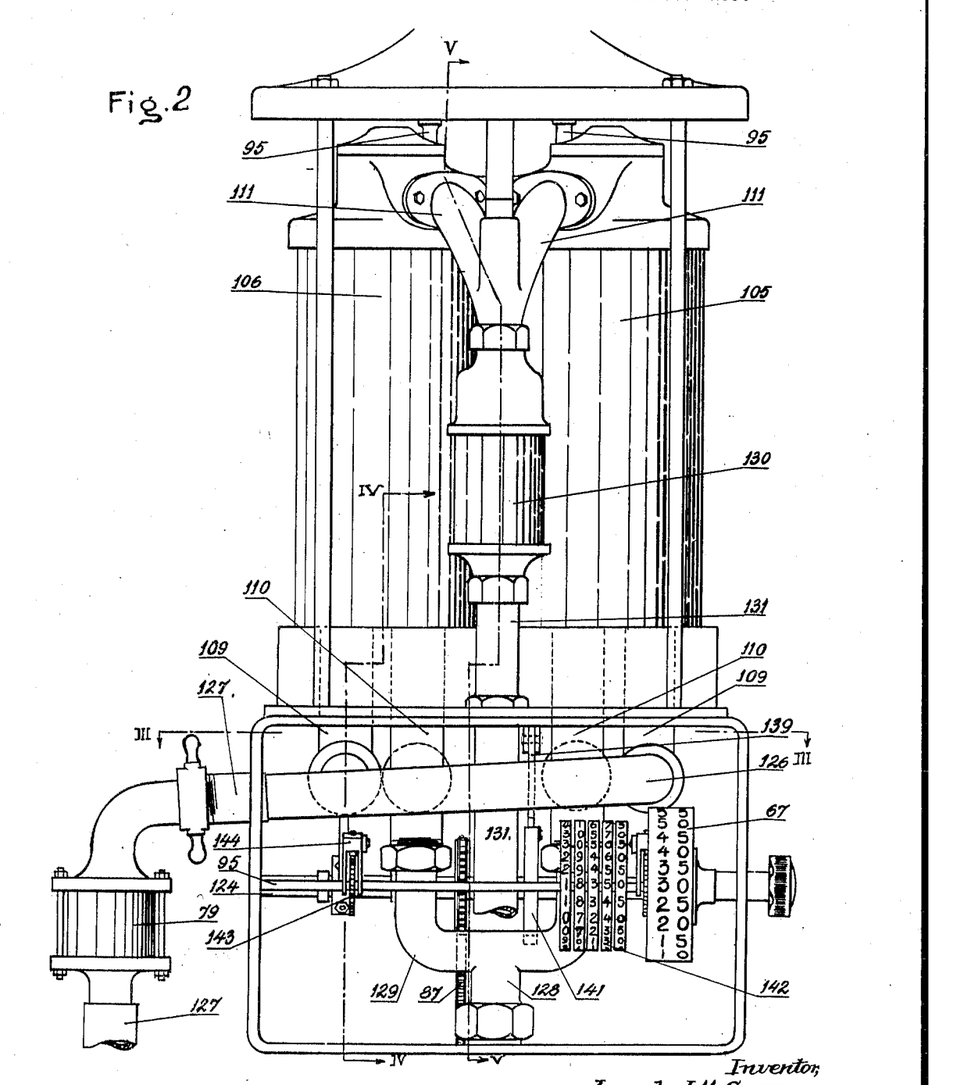
Fig. 2 is a partial elevational view on a larger scale, showing a portion of the mechanism.
Figure 2:
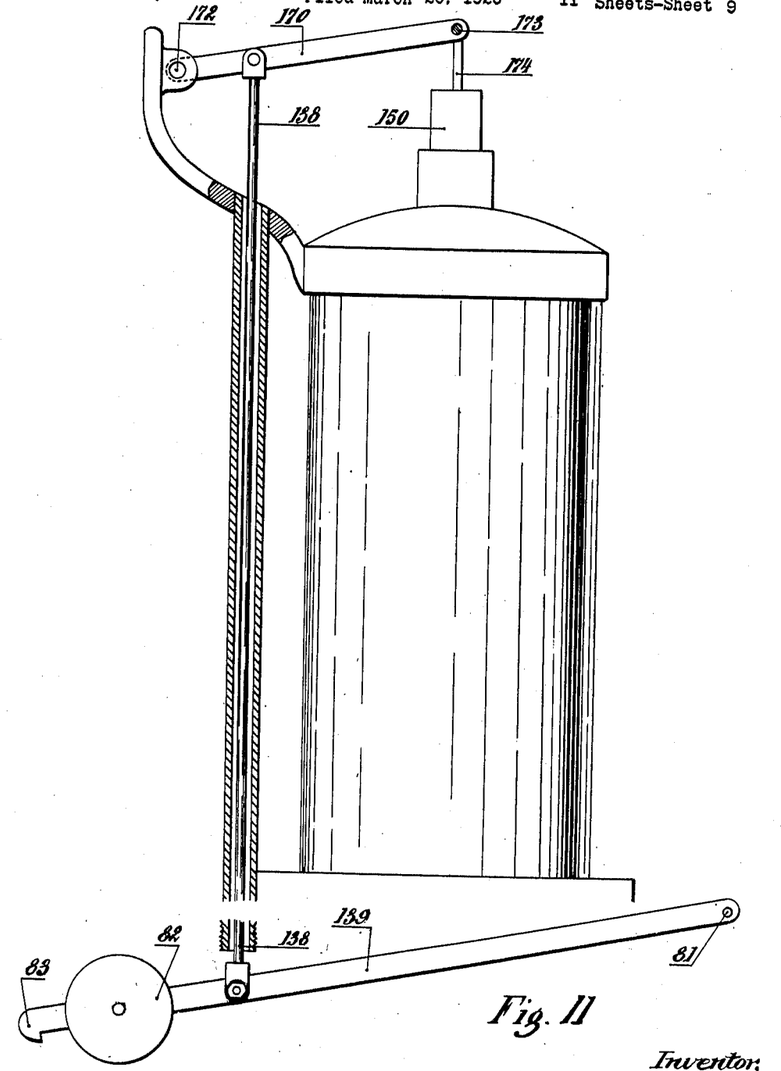

As shown in Figs. 2 and 3, the discharge conduit of the supply pump 78 is divided into two branches 129 which communicate respectively with the two cocks termed "supply cocks" mounted on the two conduits 110. Forwardly of the two supply cocks, the delivery conduits 109 which they control come together in a collecting chamber 126 from which leads a conduit 127 which opens to the exterior in the checking or observation element 79 which is made of glass and to which is attached the delivery hose 127'.

The two overflow conduits 111 end in a glass chamber 130 for observation purposes; from the bottom of said chamber starts a conduit 131 leading to the supply tank, not shown, from which the liquid is withdrawn by the pump 78.

At a short distance below the orifices of the two conduits 111 in the observation element 130 (Fig. 5) is disposed a small disc 133 mounted on a rod 132 which is slidable in a bore 80 so as to extend downwardly.

This rod 132 is pivoted to one end of a rocking lever 135 which latter is pivoted to the axle 136 of the frame, and whose other end is connected at 137 with a rod 138. A lever 139 pivoted as at 81 to the casing 107 is connected to the lower end of the rod 139.

The lever 139, which is weighted by the counterweight 82, has a pointed end 83 coacting with two shoulders 84 of a disc 141 mounted on the crankshaft 124.

Adjacent each shoulder 84, the disc 141 carries an outwardly spring actuated plate 85 which is curved as shown in the plan view, Fig. 3.

A ratchet wheel 149, keyed to the shaft 124, will allow the rotation only in one direction (Fig. 3). The crankshaft 124 has mounted thereon a toothed wheel 86 coacting with a chain 87; the chain is guided upon the supporting wheels 188 and cooperates with a pinion 88 mounted on the axis of the crank 125.

Figure 6:
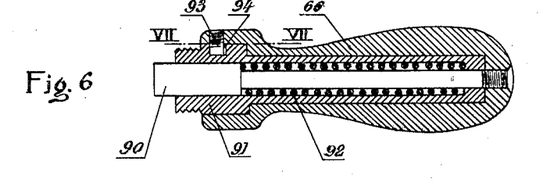
Fig. 6 is a section of the crank handle.
Figure 7:
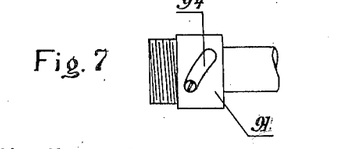
Fig. 7 is a view on the line VII—VII of Fig. 6.

The crank 125 carries a handle 66 which is chiefly shown in section in Figs. 6 and 7. An abutment 89 is disposed on the base 108 of the apparatus and comes into contact with the handle at each turn of the crank. Within the handle, means are provided whereby the device will not meet the abutment 89 at the beginning of each turn.

The member coacting with the abutment 89 is a rod 90 which is secured to the handle 66 but which is slidable in the member 91 secured to the crank 125. A spring 92, disposed within the member 91 urges the rod 90 outwardly. A stud 93 mounted on the handle and engaged in a helical slot 94 in the member 91 (Fig. 7) serves to guide the handle when it is turned, and in this manner the rod 90 when moved within the handle, will not make contact with the abutment.

Each recipient 105, 106 carries at the top a valve 95 whose operative part 96 consists of a small disc which is urged outwardly by a spring 97.

The apparatus is provided with a totalizing meter 142 whose shaft 95 carries a drum 67 which is provided with scale divisions and can be returned to zero, and with two ratchet wheels 143. The pawls 144 coacting with the wheels are each pivoted to a link 145 which is attached at 146 to one of the two feeding handles 120. The height of the axis 146 is so determined that at each movement of the handle 120, the meter will indicate the quantity corresponding to the volume of one of the gauging recipients 105 or 106.

The four sleeves 123 of the crankshaft 124 are set in the 180 degree position, so that the delivery conduit 109 of one of the gauging recipients will be open when the other is closed. At the same time, the delivery conduit 110 of the first recipient will be closed, and the conduit of the second will be opened.

The operation is as follows:

Let it be supposed that the recipients 105 and 106 are empty. If the pump 78 is actuated, the liquid which is discharged will rise through the conduit 128 into the two branches 129. The cock of one of these two branches is closed. The cock of the other branch is now in the open position, and the liquid fills the corresponding gauging recipient. According as this becomes filled, the air which it contains will be discharged through the overflow conduit 111—131.

When the recipient is filled, if the pumping is continued, the excess of liquid will flow out through the conduit 111, and when this liquid passes through the observation device 130, the overflow of the recipient will be noticed.

The liquid when falling will meet with the disc 133 and will cause it to descend. Due to the action of the members 132—135—138, the lever 139 will rise, and its end 83 will be disengaged (Fig. 5) from the shoulder 84 of the disc 141. The spring strip 85 will take a position adjacent the shoulder and will prevent the end 83 from dropping thereon, even should the pump be momentarily stopped, and the shaft 124 can now be rotated.

For the delivery of the liquid which has thus been measured off, the end of the hose 127' is disposed in the customer's container, and the operator seizes the handle 66 of the crank 125. Due to the slight rotation which is given to the handle, the rod 90 is disengaged from the abutment 89, due to the helical guiding of the stud 93 of the handle. The crank 125 is then given a complete turn so that the rod 90 will again make contact with the abutment 89, and due to the chain 87, the crankshaft 124 will thus make half a revolution.

From the start of this rotation, the cock controlling the delivery conduit discharging into the customer's vessel which has now been filled will now be closed, and the disc 133 which is no longer pushed out by the overflow liquid will now rise. The end 83 of the lever 139 now drops upon the edge of the disc 141.

As the shaft 124 continues to rotate, the four cocks will all remain closed for a certain time, and then the feed cock of the filled gauging recipient and the supply or inlet cock of the empty recipient will be opened. At the end of the half-revolution, a shoulder 84 of the disc 141 engages the end 83 which forces aside the curved spring strip 85 and the shaft 124 is thereby held in this position.

Since the feed or outlet cock of the filled recipient is open, the meter 142, which is actuated by the link 145 and the pawl 144, will register the amount of liquid supplied. At the same time, the liquid is discharged through the conduit 127 into the glass checking vessel 79, and flows thence through the pipe 127' into the customer's recipients. This output may thus be checked by means of the vessel 79.

During this time, if the pumping is continued the recipient, which was formerly empty will now be filled to overflowing. When it overflows it will disengage the pointed end 83, so that the measured quantity of liquid can thus be discharged, and the same cycle of operations is continued.

The principal operations, i. e. the filling, the overflow and the delivery, are quite visible, due to the transparent nature of the recipients 105 and 106 and the checking elements 130 and 79, so that all improper operations are made impossible, and any fraudulent use of the apparatus will be at once made apparent.

By selecting the dimensions of the parts so that one of the recipients will be emptied in a time which is very slightly below the time required to fill the other, it is evident that my apparatus may assure a delivery of liquid which will be almost continuous.

Figure 8:
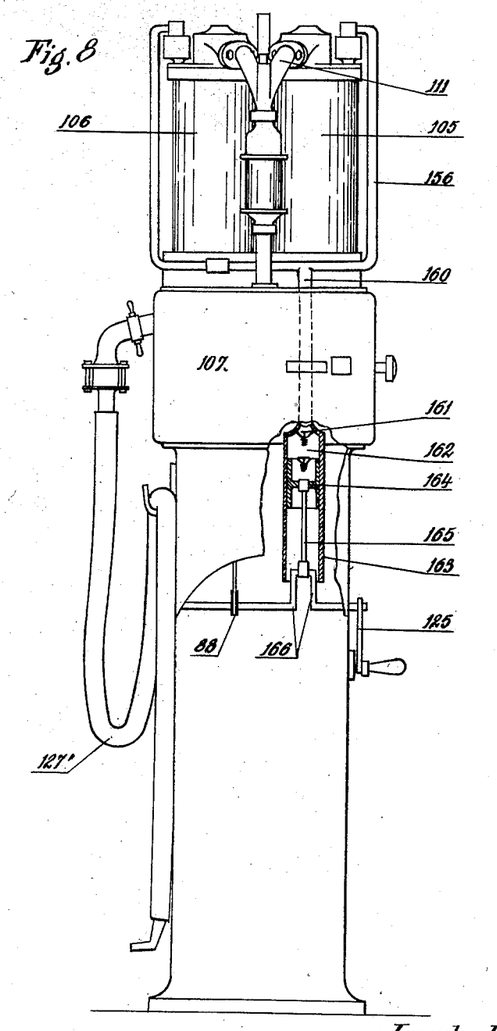
Figs. 8 and 9 are elevational views of a modification, with parts broken away.
Figure 9:
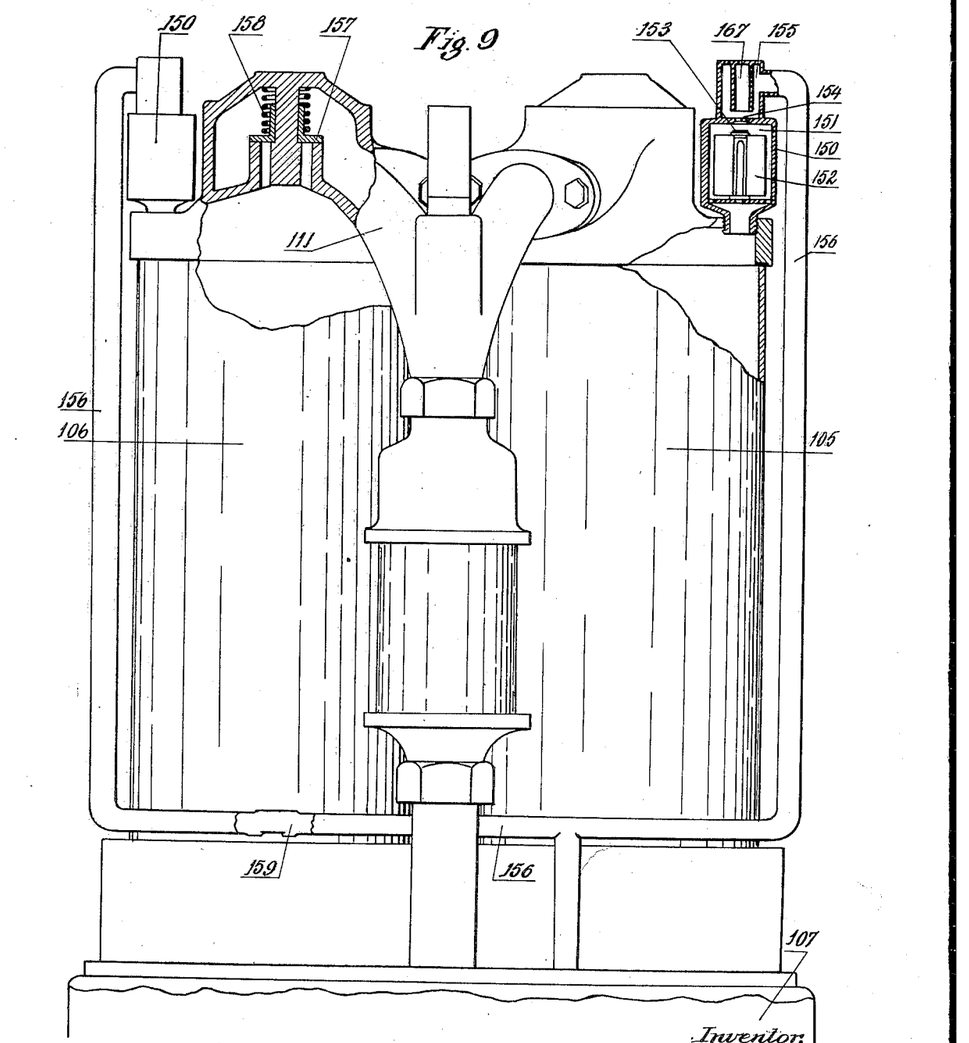

The particular arrangements shown in Figs. 8 and 9 serve to prevent in a reliable manner one of the recipients from being filled before the other is entirely emptied, even if by accident the discharge from the delivery pipes is counteracted by an air pocket or like obstacle.

In these figures, 107 is the casing of the mechanism, and 105 and 106 show the two gauging recipients, with their overflow conduit 111.

At the upper part of each of the recipients 105 and 106 is mounted a float valve 150 which comprises (Fig. 9) a chamber 151 communicating with the said recipient and containing a float 152 whereof the upper part has the form of a valve 153 which is applied upon a seating 154 when the float 152 is raised by the liquid which fills the chamber 151. At the other side of the said seating is disposed a small chamber 155, and the two chambers 155 of the two float valves 150 are connected together by the conduit 156.

Furthermore, the connection between each recipient 105 and 106 and its overflow 111 is closed off by a valve 157 (Fig. 9) controlled by a spring 158 having the proper tension.

Finally, the small valves 95 above described, are herein eliminated and are replaced by a disc valve 159 mounted in the conduit 156, which is therefore common to the two recipients 105 and 106. It will be understood that the valve 159 will open when the outward pressure is greater than the inward pressure, that is, when one recipient is emptied without filling the other.

The operation of the aforesaid combination of float valves and spring valves is as follows:

Since the liquid supply to one of the recipients is already started, as well as the delivery of the liquid from the other recipient, the ascent of the liquid in the first recipient causes a certain air pressure which when encountering the valve 157, cannot be discharged through the overflow conduit 111, so that this air will pass through the float valve 150, which is open, and will enter the conduit 156 which leads it into the other recipient which is emptying.

As in this recipient the overflow conduit is also closed by a spring mounted valve 157, the air pressure will be exercised upon the liquid whereby its discharge will be furthered.

When the first recipient is filled, the liquid will enter the chamber 151 of the float valve; the float 152 will be lifted, its upper part 153 presses against the seating 154 and thus prevents the liquid from entering the conduit 156. But as the supply of the liquid continues, the pressure of the liquid in the filled recipient now exceeds the tension of the spring 158; the valve 157 is lifted, and the excess of liquid is discharged, as before, through the overflow conduit 111.

To effect the discharge of the liquid from the recipient to be emptied with still greater facility I prefer to add to the aforesaid arrangement a device which acts at the beginning of the operation to inject a certain amount of air into the conduit 156.

This device as illustrated in Figure 8 comprises a conduit 160 communicating with the conduits 156 at its upper end and its lower end communicating with the chamber 162 of a pump barrel 163. A check valve 161 is arranged in the pump barrel and permits the escape of air from the chamber 162 to the conduit 160. A piston 164 is slidably mounted within the pump barrel and is connected to the crankshaft 166 by means of a piston rod 167 whereby upon each rotation of the crankshaft through the medium of the operating handle air is forced under pressure to the chambers 151.

At the beginning of each delivery operation, it being necessary to give the handle 125 a complete turn, the pump 163 effects a complete cycle and delivers a certain amount of air into the conduit 156, thus producing an excess of pressure from the start, and this will further the starting of the liquid at the outflow, even should the hose 127' contain an air pocket or like obstacle acting against the discharge.

I have also made an improvement in the float valve shown in Fig. 9; in the chamber 155 is disposed the deflecting member 167 which is placed just above the seating 154, and in this manner, if upon closing the valve, a few drops of liquid should pass between the valve 153 and its seating 154, this liquid will be driven into the deflecting member 167 whence it will soon fall, and this device will effectively prevent any drops of liquid from entering the conduit 156 in an improper manner.

When the overflow conduits of the said gauging recipients are not employed, i. e. when the tank supplying the dispensing apparatus is under pressure, the control of the lever 139 (Fig. 5), holding the crankshaft, can no longer be effected by the small disc 133. In this event I prefer to use one of the arrangements shown in Figs. 11, 12 and 13. The rod 138 (Figs. 10 and 11) which is connected with the lever 139, is attached to a lever 170 pivoted to an axle 172 of the main frame and is pivoted at its end to the middle part of a lever 173 connecting together two rods 174 mounted on the floats 152 of the two recipients.

Figure 10:
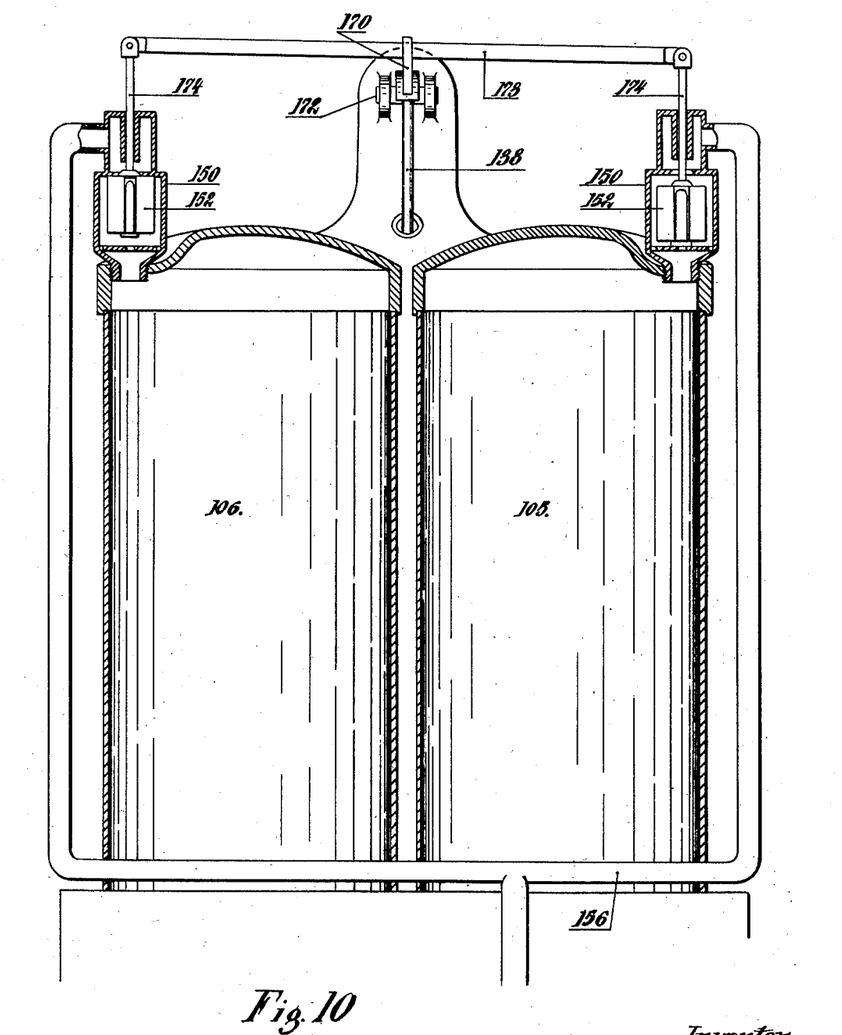

When one of the said recipients is filled up, its float 152 now rises, and due to the movements of the lever 173, of the lever 170 and of the rod 138, the holding lever 139 will be raised, thus releasing the said crankshaft from the mechanism.

Figure 12:
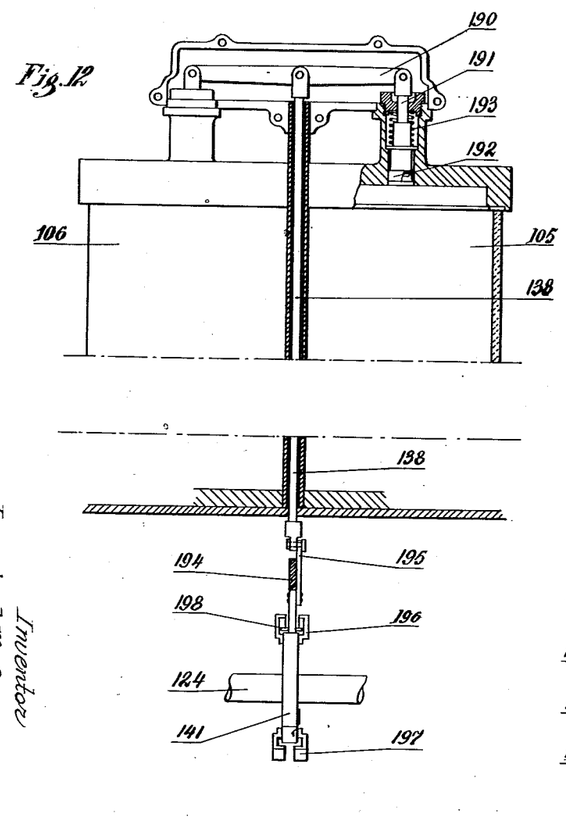
Figure 13:
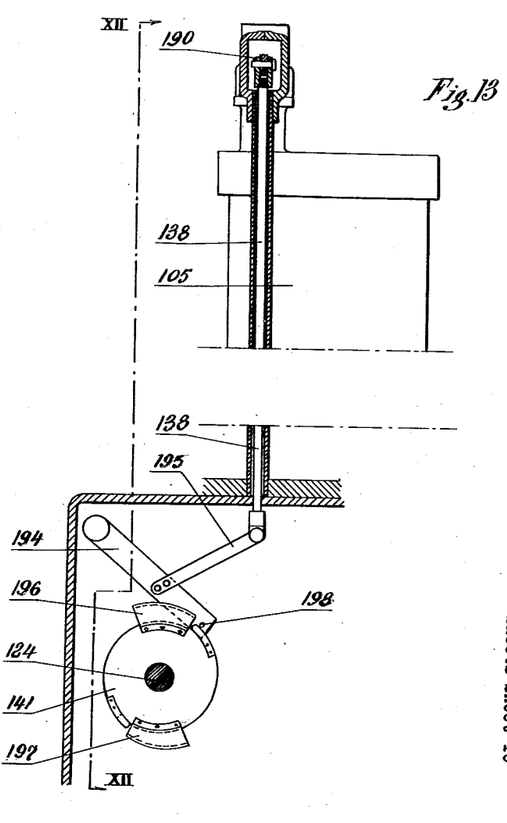

An analogous device is shown in Figs. 12 and 13. The aforesaid rod 138 is pivoted directly to the middle of a lever 190 each end of which is attached to the rod 191 of a manometric piston 192 controlled by a spring 193 and disposed at the top of one of the recipients 105 or 106. The manometric piston 192 of each recipient will thus in fact fulfill in connection with the rod 138, the same function as the float 152 of Fig. 10.

I however make an improvement in the lever 194 which is controlled by the rod 138 and coacts with the disc 141 comprising shoulders, mounted on the crankshaft 124 of the mechanism.

Fig. 13 shows the said lever 194 connected with the rod 138 by link 195 and pressed upon the disc 141; the said lever carries a stud 198 coacting with the inclined guides 196 and 197 provided on the disc 141 adjacent the shoulders.

The stud 198 and the guides 196 and 197 serve to bring back the lever 194 into the proper position for holding the disc 141 even should the springs 193 of the pistons 192 be broken or weakened.

Figure 14:
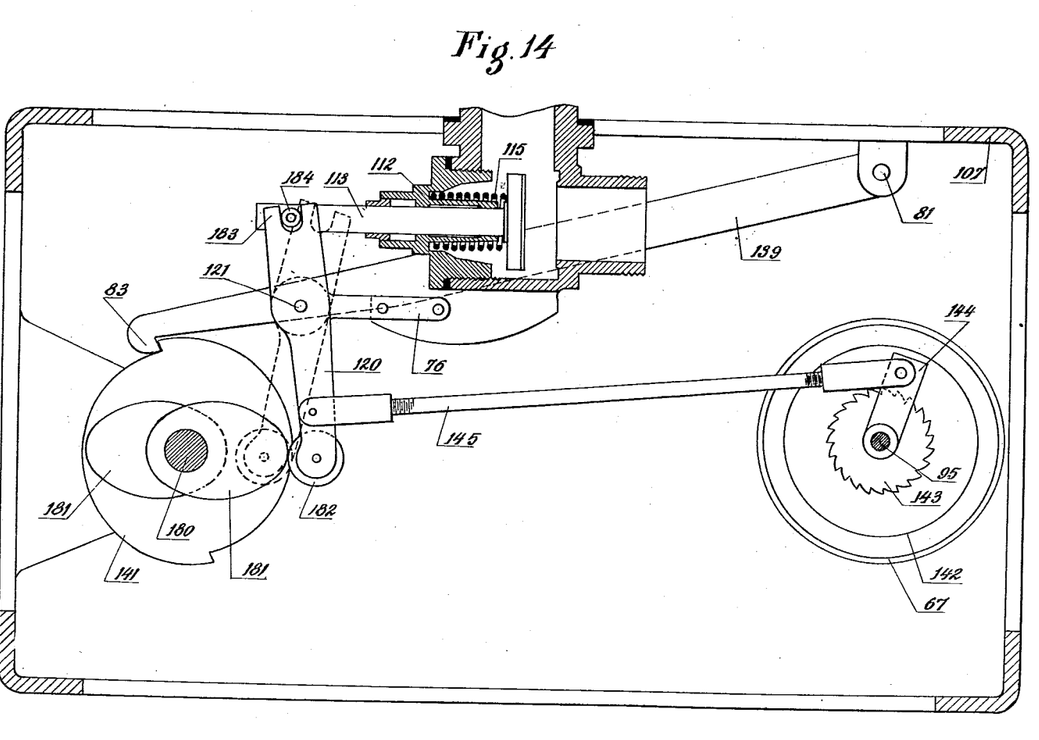
Fig. 14 shows a modification of the mechanism of the dispensing apparatus.

A modification is shown in Fig. 14, in which the crankshaft controlling the cocks is replaced by a shaft 180 provided with cams 181 having a suitable shape and position. Each cock handle 120 is now terminated by a roller 182 coacting with one of the cams 181 of the cam shaft 180. At the other end of the handle 120 is mounted the fork 183 having between its branches a roller 184 mounted on the rod 113 of the cock properly so called. The cock spring 115 will thus urge the handle 120 into contact with the corresponding cam.

The shaft 180 carries in the same manner as the crankshaft in the preceding example a disc 141 comprising shoulders, a gear wheel and a ratchet wheel not shown in Fig. 14, so that the shaft 180 will serve exactly the same purpose as the aforesaid crankshaft.

Claims:

1. A liquid dispensing apparatus comprising a pair of liquid recipients each havng an inlet and outlet opening, a valve for controlling each opening, a lever for each valve, a driven shaft, cams carried by said shaft and adapted at times to actuate said levers, and means for preventing rotation of said shaft until at least one of said recipients is completely filled with a liquid.

2. A liquid dispensing apparatus comprising a pair of liquid recipients each having an inlet and outlet opening, a valve for controlling each opening, a lever for each valve, a driven shaft, cams carried by said shaft and adapted at times to actuate said levers, a disc carried by said shaft, a weighted lever adapted to normally engage said disc to prevent rotation of said shaft, and means operatively connected to said lever whereby when one of said recipients is filled with liquid said weighted lever will be moved out of engagement with said disc.

3. A liquid dispensing apparatus comprising a pair of liquid recipients each having an inlet and outlet opening, a valve for controlling each opening, a lever for each valve, a driven shaft, cams carried by said shaft and adapted at times to actuate said levers, locking means for preventing rotation of said shaft, means actuated by the flow of liquid in said recipients for releasing said locking means, an air pump communicating with said recipients and means operatively connecting said air pump to said shaft whereby upon the rotation of said shaft air under pressure will be supplied to said recipients.

4. A liquid dispensing apparatus comprising a plurality of recipients each having an outlet and inlet opening, valves for said openings, a driven shaft for controlling said valves, means for preventing the rotation of said shaft and manometric means arranged in each recipient for actuating said shaft preventive rotating means.

5. A mechanism for a liquid dispensing apparatus comprising in combination a pair of recipients each having an inlet and outlet opening, a valve arranged within each inlet and outlet opening, a driven shaft, cams mounted upon said shaft and operatively connected to said valves, a manometric piston placed at the top portion of each recipient, a lever connected to and actuated by each manometric piston, shouldered discs carried by said shaft, inclined guides arranged upon each disc and a stud carried by each lever and cooperatingly associated with said inclined guides carried by said shouldered discs.

In witness whereof I have hereunto set my hand.

JOSEPH JEAN MARIE GUEUX.